United States Patent
Gribble et al.

(10) Patent No.: US 9,002,571 B1
(45) Date of Patent: Apr. 7, 2015

(54) AUTOMATED PREFLIGHT WALK AROUND TOOL

(75) Inventors: David A. Gribble, Cedar Rapids, IA (US); Steven R. Miller, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 13/592,568

(22) Filed: Aug. 23, 2012

(51) Int. Cl.
*G06F 19/00* (2011.01)
*G06Q 10/06* (2012.01)

(52) U.S. Cl.
CPC .................. *G06Q 10/0637* (2013.01)

(58) Field of Classification Search
USPC ........................................................ 701/33.2
See application file for complete search history.

(56) References Cited

U.S. PATENT DOCUMENTS

| | | | |
|---|---|---|---|
| 6,529,620 B2 * | 3/2003 | Thompson | 382/141 |
| 7,048,185 B2 * | 5/2006 | Hart | 235/384 |
| 7,209,814 B2 * | 4/2007 | Kipersztok et al. | 701/31.6 |
| 7,617,029 B2 * | 11/2009 | Loda | 701/31.6 |
| 7,808,369 B2 * | 10/2010 | Brinton et al. | 340/306 |
| 7,983,809 B2 * | 7/2011 | Kell et al. | 701/29.3 |
| 8,352,107 B2 * | 1/2013 | Hyde et al. | 701/22 |
| 2009/0256693 A1 * | 10/2009 | Brinton et al. | 340/439 |
| 2010/0235037 A1 * | 9/2010 | Vian et al. | 701/29 |
| 2010/0256865 A1 * | 10/2010 | Ying | 701/33 |

* cited by examiner

*Primary Examiner* — Thomas Tarcza
*Assistant Examiner* — Alex C Dunn
(74) *Attorney, Agent, or Firm* — Angel N. Gerdzhikov; Donna P. Suchy; Daniel M. Barbieri

(57) ABSTRACT

A system for completing a walk around inspection of an aircraft is provided. The system may include a processor, a memory, and a user interface. The user interface also includes a user input system and a user output system. The user interface is configured for presenting a graphical checklist for a walk around inspection of an aircraft. The system also includes a communications device. The communications device is configured for communicating with an Onboard Maintenance System for the aircraft. The system, including the processor, memory, user interface and communications device, can be used to perform the inspection of the aircraft and provide a compliance record for the inspection.

20 Claims, 6 Drawing Sheets

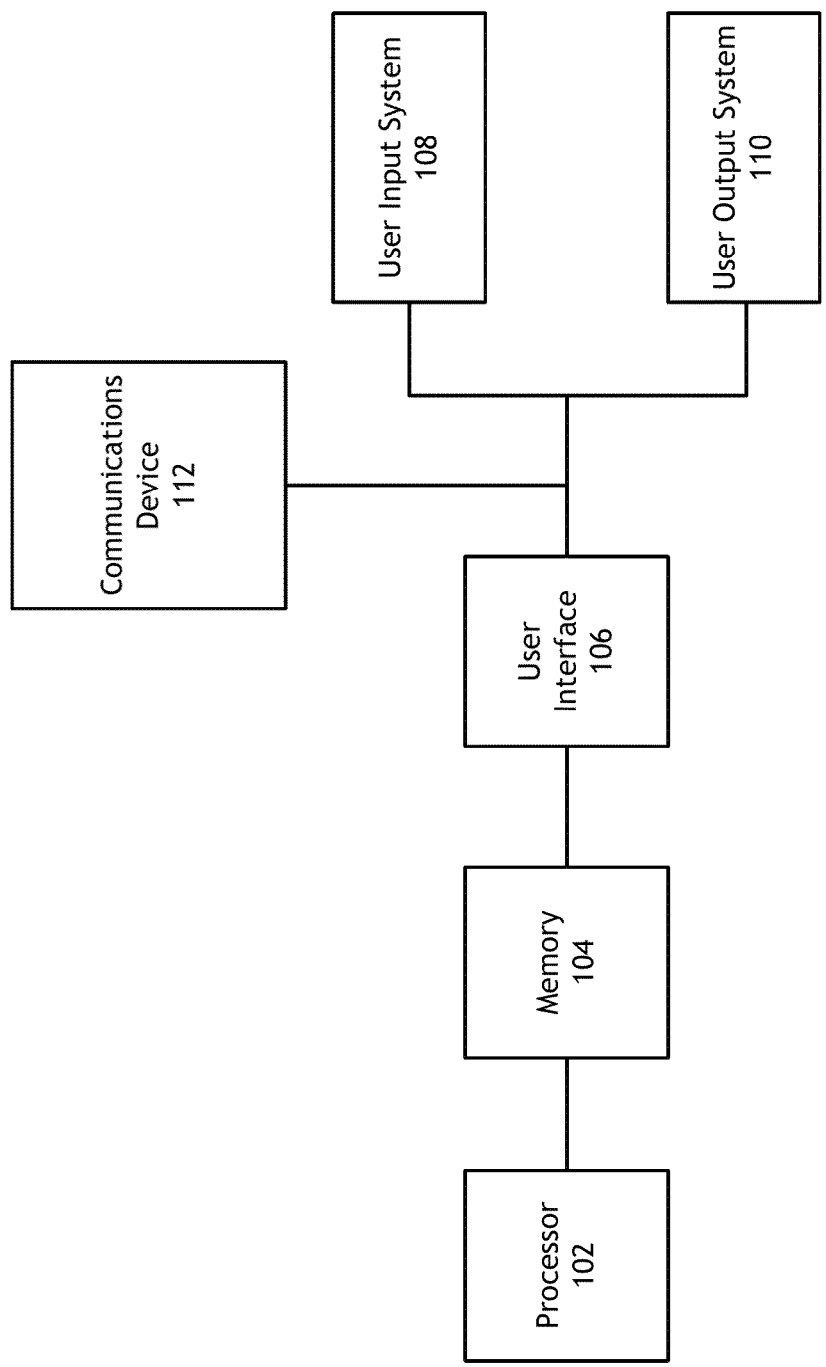

AUTOMATED PREFLIGHT WALK AROUND TOOL

TECHNICAL FIELD

The present disclosure generally relates to the field of aircraft inspections, and more particularly to a system and method for performing a walk around inspection of an aircraft.

BACKGROUND

In order to comply with the regulations of the Federal Aviation Administration, International Civil Aviation Organization, or other regulators, it is necessary to gather and consider appropriate information before and after flight. Similarly, certain information may need to be gathered and considered before and after flight in order to comply with an airline's company policies, and to generally provide for safe operation of an aircraft. This information is typically gathered during a preflight or a post flight inspection.

One aspect of the pre or post flight inspection may include a walk-around inspection of the aircraft. These inspections may be performed by flight crew using printed material such as a checklist.

The use of printed checklists to perform walk around inspections of an aircraft may present several problems. First, printed checklists are not necessarily tracked item by item and it is possible to miss critical items on the checklist. Similarly, flight crews may become accustomed to routine inspections and may ignore some of the items on the printed checklist. In addition, printed checklists are not able to highlight problem areas, such as recent maintenance issues with the aircraft or other potential problems based on the particular aircraft subject to the inspection. Printed checklists are static documents that cannot provide information beyond what is printed on the page. In addition, printed checklists are inflexible and subject to space and formatting constraints. These constraints may result in printed checklists that do not provide sufficient detail for the particular aircraft and circumstances to allow the flight crew to determine whether to pass or fail an item on the checklist. Last, current methods for performing a walk around inspection of an aircraft do not provide dynamic communication of the results of the inspection or compliance information in real time.

Therefore, there exists a need for improved methods and systems for performing and documenting a walk around inspection of an aircraft.

SUMMARY

A system for completing a walk around inspection of an aircraft is provided. The system may include a processor, a memory, and a user interface. The user interface also includes a user input system and a user output system. The user interface is configured for presenting a graphical checklist for a walk around inspection of an aircraft. The system also includes a communications device. The communications device is configured for communicating with an Onboard Maintenance System for the aircraft. The system, including the processor, memory, user interface and communications device, can be used to perform the inspection of the aircraft and provide a compliance record for the inspection.

The present disclosure is also directed to a method for completing a walk around inspection of an aircraft. The method includes the step of receiving data from an Onboard Maintenance System for the aircraft on a portable device. The next step of the method is to log at least one result of at least one checklist item on the portable device and communicating the result from the portable device. Using this method, it is possible to document completion of the walk around inspection of the aircraft.

The present disclosure is also directed to another method for completing a walk around inspection of an aircraft. The method includes the step of receiving data from an Onboard Maintenance System for the aircraft on a portable device. Next, the method involves requesting additional information from at least one of: the Onboard Maintenance System, a maintenance manual, or a maintenance support provider. This additional data is then received on the portable device. The method also involves recording at least one result of at least one checklist item on the portable device and communicating the result of the at least one checklist item.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The numerous advantages of the disclosure may be better understood by those skilled in the art by reference to the accompanying figures in which:

FIG. 1A is a diagram of a system for performing a walk around inspection of an aircraft;

DETAILED DESCRIPTION

Figure 1B:
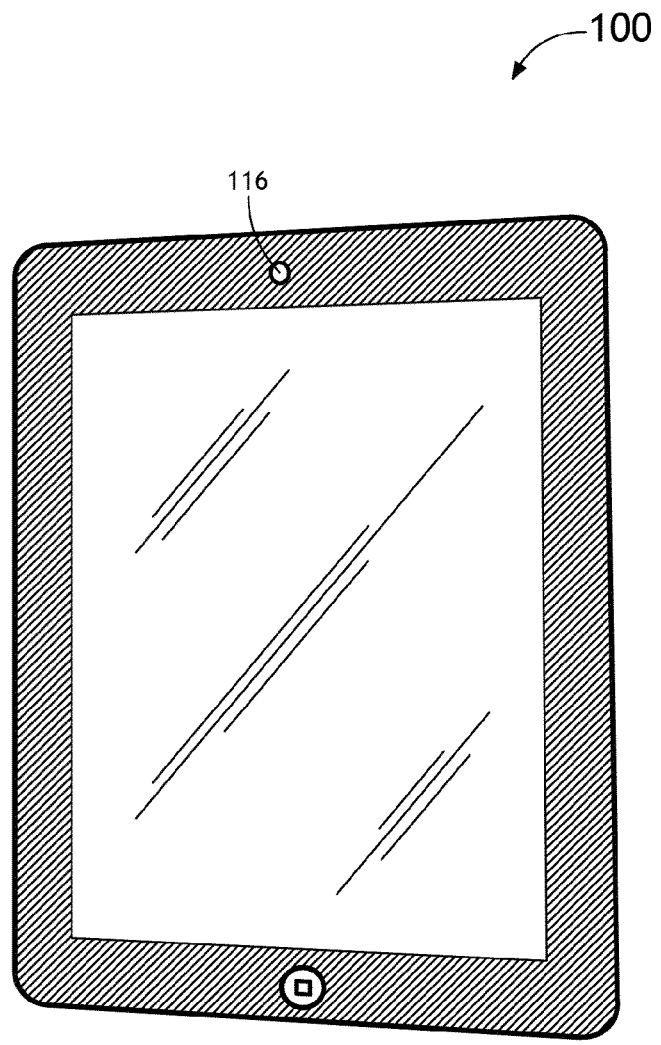
FIG. 1B depicts a system for performing a walk around inspection of an aircraft.

Reference will now be made in detail to the subject matter disclosed, which is illustrated in the accompanying drawings.

A system 100 for completing a walk around inspection of an aircraft is shown in FIG. 1A. The system 100 may include a processor 102, a memory 104, and a user interface 106. The user interface 106 also includes a user input system 108 and a user output system 110. The user interface 106 is configured for presenting a graphical checklist for a walk around inspection of an aircraft. The system 100 also includes a communications device 112. The communications device 112 is configured for communicating with an Onboard Maintenance System for the aircraft. The system 100, including the processor 102, memory 104, user interface 106 and communications device 112, can be used to perform the inspection of the aircraft and provide a compliance record for the inspection.

The system 100 may be used to perform an inspection of an aircraft, specifically a walk around inspection before or after flight. The inspection may include an inspection of the elements of an aircraft for security, safety, maintenance, and operational compliance. For example, the walk around inspection may include an inspection of components and systems of the aircraft from the exterior of the aircraft. The system 100 may be configured to be lightweight and handheld in order for it to be easily carried by an operator during the inspection. The system 100 may optionally include a strap, handle, clip, or other means for handling or securing the system to the person of an operator or elsewhere. The system 100 may optionally include a camera for taking photographs or videos during the inspection of the aircraft.

FIG. 1B shows the system 100 for completing a preflight inspection of an aircraft in one embodiment of the present disclosure. The system 100 may be a handheld electronic device, such as a tablet computer. In one embodiment, the system 100 may include a camera 116 for taking photographs or videos during the inspection of the aircraft.

The communications device 112 of the system 100 shown in FIG. 1A is configured for both receiving and sending information. For example, the communications device 112 may be configured for receiving maintenance data from the aircraft, and also for communicating the results of the inspection to an on board aircraft system or other entity. The communications device 112 may be a wireless communications device, cellular communications device, modem, or any other suitable device for sending and receiving information with a data network, such as the internet.

In one embodiment, the communications device 112 of the system 100 is configured for communicating with the Onboard Maintenance System for the aircraft. The Onboard Maintenance System is an aircraft monitoring system that continuously monitors and records the status of components of aircraft systems. The Onboard Maintenance System provides a single point of access to data about the health of the various systems aboard the aircraft. The system 100 is connected to the Onboard Maintenance System for the aircraft via the communications device 112, and the system 100 is configured to receive data from the Onboard Maintenance System about the particular aircraft. The data may include known deficiencies or faults for the aircraft, maintenance records, engine data, Aircraft Condition Monitoring data, line replaceable unit data, and any other information collected by the Onboard Maintenance System. The communications device 112 may be configured to provide high speed or immediate communication with the Onboard Maintenance System.

The communications device 112 of the system 100 may also be configured to receive data from other sources. For example, the communications device 112 may be configured for communicating with a maintenance support provider, airline, aircraft traffic control regulator, aircraft systems manufacturer, or other entity. Similarly, the communications device 112 may be configured to send data to the aircraft's Onboard Maintenance System, flight deck, a maintenance support provider, airline, regulator, aircraft systems manufacturer, or other entity. This data may include information gathered during the walk around inspection, a compliance result of the inspection, or a request from an operator for additional information or support. In one embodiment, the communications device 112 is configured to send the inspection status to the on board aircraft avionics checklist.

The system 100, as shown in FIG. 1A, includes a user interface 106 comprising a user input system 108 and a user output system 110. The user interface 106 is configured for presenting a graphical checklist for the inspection of the aircraft. The user input system 108 may include a system allowing an operator to enter requests, information, or commands. For example, the user input system 108 may include a touch screen, a multi-touch surface, a pressure-triggered screen with a stylus, a keyboard, mouse, or any other suitable device for receiving inputs from an operator. The user output system 110 may include a display device for displaying graphical, video, photographic, and textual information to an operator. In one embodiment, the user output system 110 is a multitouch display.

The system 100 shown in FIGS. 1A and 1B also includes a processor 102 and a memory 104. The processor 102 is configured to control the operations of the system 100 and may include any suitable computer processor. For example, the processor 102 processes the inputs and requests received from the operator and also executes software instructions that provide the graphical checklist. The memory 104 provides storage for the data related to the inspection as well as various checklists. The memory 104 may also be used to store maintenance data, maintenance manuals, and other operational information. The memory 104 may include removable memory such as a disc or card, or memory that is not integrated with the system 100.

The system 100 shown in FIGS. 1A and 1B provides a graphical checklist for performing an inspection of the aircraft and providing a compliance record for the inspection. The graphical checklist provides a graphical aircraft summary for the inspection of the aircraft. The graphical checklist may also provide a detailed checklist at each inspection point for completing the inspection.

The graphical checklist may include checklist software. The checklist software may be configured to facilitate the development of flexible and modified checklists. For example, checklists may be modified and customized to a particular aircraft type. Additionally, the checklists may be adaptable to different avionics scenarios and to coordinate with other aircraft systems.

The graphical checklist is linked to the Onboard Maintenance System for the aircraft subject to the inspection via the communications device 112. The graphical checklist displays information about any known aircraft deficiencies to an operator, as well as maintenance information, as provided by the Onboard Maintenance System via the communications device 112. As the Onboard Maintenance System detects failures and keeps maintenance records for the aircraft, the linkage to the Onboard Maintenance System can assist an operator in determining whether an item on the checklist should pass or fail. Additionally, the linkage to the Onboard Maintenance System with the graphical checklist can provide an operator with information about how to remedy a problem with the aircraft.

For example, the system 100 can provide an electronic linkage to maintenance information, including manuals, parts catalogs, service bulletins, maintenance records, and the like to help clarify information about a particular item on the graphical checklist. This maintenance information provides the operator with information that may be required in resolving questionable points that arise during the walk around inspection. Further, the maintenance information may assist the operator in resolving the problem.

Figure 2:
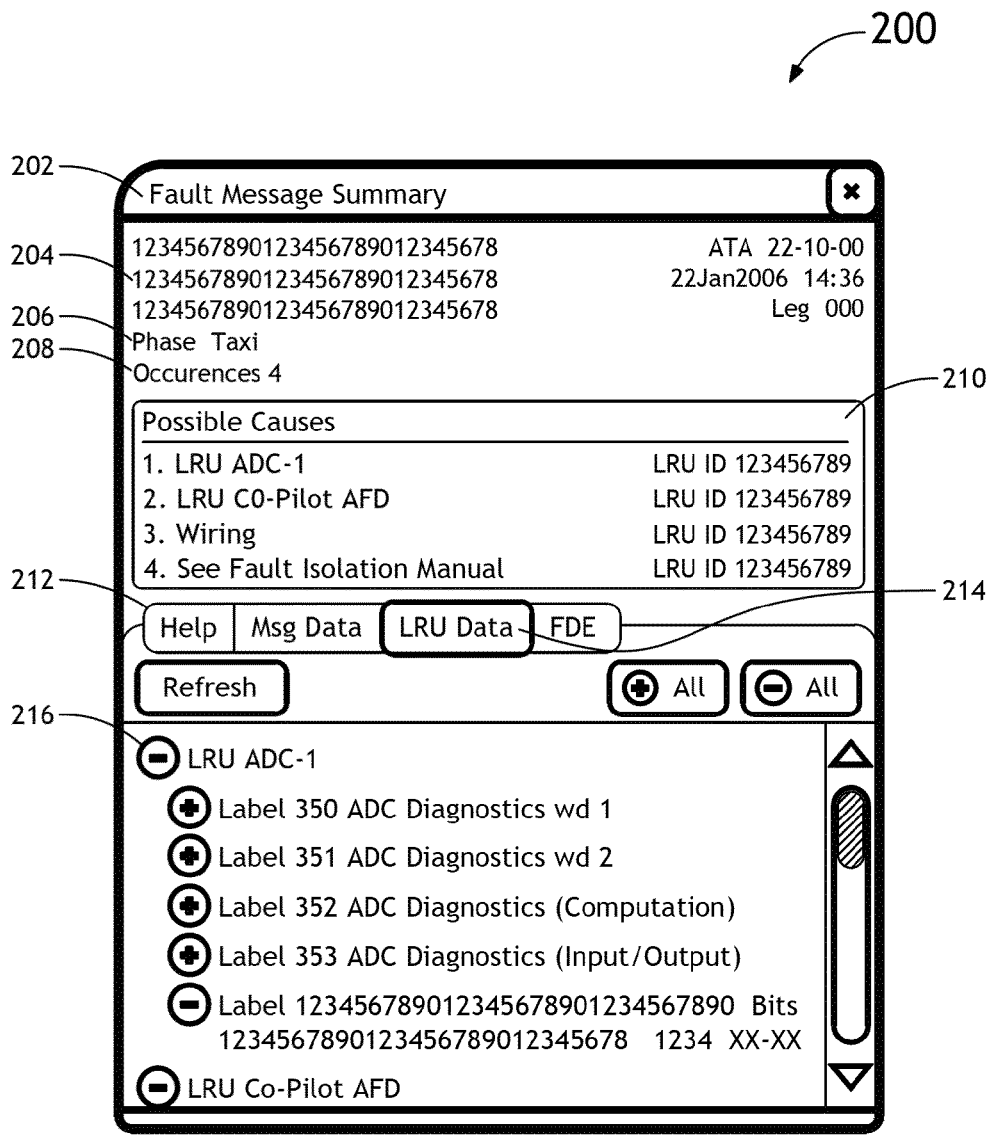
FIG. 2 is an example of an electronic checklist including maintenance in formation of the system for performing a walk around inspection of an aircraft.

An example of the electronic checklist 200 of the system 100 is shown in FIG. 2 of the present disclosure. Specifically, FIG. 2 shows how maintenance information may be presented to an operator on the electronic checklist 200 of the system 100. The maintenance information may be received from the aircraft's Onboard Maintenance System. The Fault Message Summary 202 on the electronic checklist 200 may include a list of faults 204, the phase 206 when the faults 204 occurred (for example, during the taxi phase), and the total number of occurrences 208. The electronic checklist 200 also includes a listing of the Possible Causes 210 for the faults 204.

In the example, the Possible Causes 210 includes a reference to a specific Line-replaceable unit (LRU) that may be the cause of the problem. The Possible Causes 210 in the example shown in FIG. 2 also refers to wiring as a potential cause and suggests the operator refer to the Fault Isolation Manual.

The example of the electronic checklist 200 of the system is shown in FIG. 2 also includes a menu 212 where a user can select additional information about the faults 204. In the example, the user has selected the prompt for additional LRU Data 214, which results in a list of additional operational data 216. Using the electronic checklist 200, an operator is able to make real time decisions about issues that arise during a walk around inspection of an aircraft.

The graphical checklist 200 may include prompts that require the operator to respond or indicate whether an item has been completed. The operator may be required to provide an associated photo or other response as may be prompted by the graphical checklist. The graphical checklist 200 may include buttons that allow the operator to advance or go back through the system, or skip an item and return to it later. The graphical checklist may also allow the operator to flag an item or add notes to an item. It may also be possible for the graphical checklist to force an operator to complete an item before advancing on to the next item on the checklist.

The graphical checklist may be aircraft specific, meaning that a particular checklist will be activated in the system to correspond to the particular aircraft receiving the inspection. The graphical checklist may also correspond to a specific checklist mode or sequence. For example, there may be a certain checklist that corresponds to the pre-fueling stage and another checklist that corresponds to the post fueling stage. Similarly, the graphical checklist may also provide a detailed checklist at each inspection point for completing the walk around inspection. The system enables the operator to skip to specific checklists, items, and stages as may be useful or helpful in completing the inspection. The graphical checklist may also include instructions for an operator that will assist the operator in making a determination about a checklist item or in resolving a problem identified during the inspection.

The system may also include a feature in the graphical checklist that allows an operator to associate photos or videos with checklist items. For example, a feature of the system may allow an operator to receive a photograph that correlates to an item on the checklist and demonstrates how the item should appear if working properly. The feature of associating photographs or videos with checklist items may also allow an operator to take a photograph or video of an item on the checklist and send the photograph to a third party, such as an operations support provider, maintenance support, equipment manufacturer, or the like. The third party may also then respond with photographic, text, or audio instructions for the operator.

The system may be used for completion tracking and reporting of walk around inspections of aircraft. For example, the system may be linked to an on board flight crew checklist. Once the walk around inspection is complete, the inspection result may be logged and communicated to an on board system for the aircraft. Similarly the result of the inspection, or any maintenance or other issues identified during the inspection, may be communicated to a third party such as an airline, regulator, maintenance support provider, or the like. The results of the inspection may also be logged and stored in the system, or transmitted and stored externally.

Figure 3:
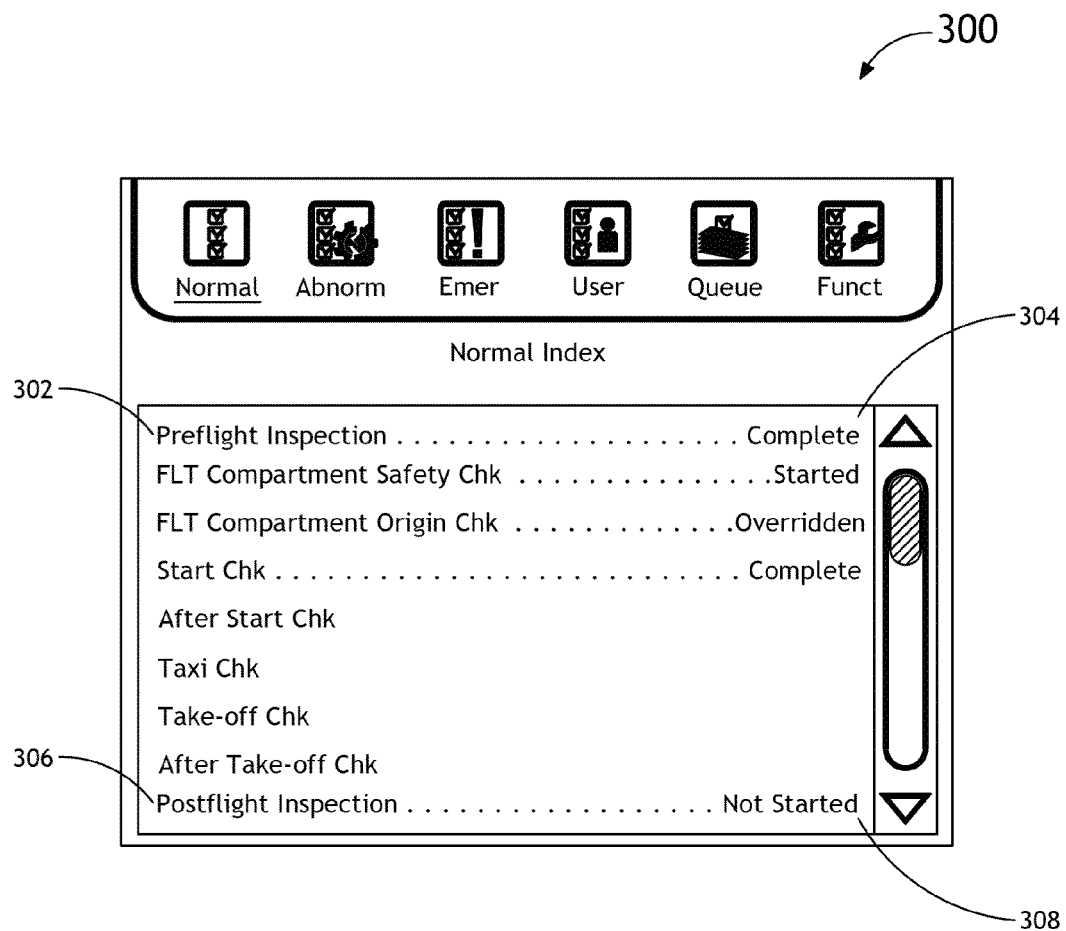
FIG. 3 is an example of an electronic checklist on the flight deck of an aircraft that has received the results of a walk around inspection performed using the system for performing a walk around inspection of an aircraft.

FIG. 3 shows an example of how the current system may be used to document completion of a walk around inspection of an aircraft. FIG. 3 shows an electronic checklist 300 located on the flight deck of an aircraft. The system 100 (shown in FIGS. 1A and 1B) for completing an inspection of an aircraft is in communication with the electronic checklist system of the flight deck of the aircraft. After the walk around inspection is complete, the system 100 communicates this result to the electronic checklist system of the flight deck of the aircraft. FIG. 3 shows that the electronic checklist system of the flight deck has received the result of the inspection and the checklist item for the Preflight Inspection 302 indicates a result of Complete 304. Similarly, the system 100 can also communicate the results of a Postflight Inspection 306 to the electronic checklist system of the flight deck. In the example shown in FIG. 3, the Postflight Inspection 306 has not been started yet, so the checklist item for the Postflight Inspection 306 indicates a result of Not Started 308 on the electronic checklist 300.

Figure 4:
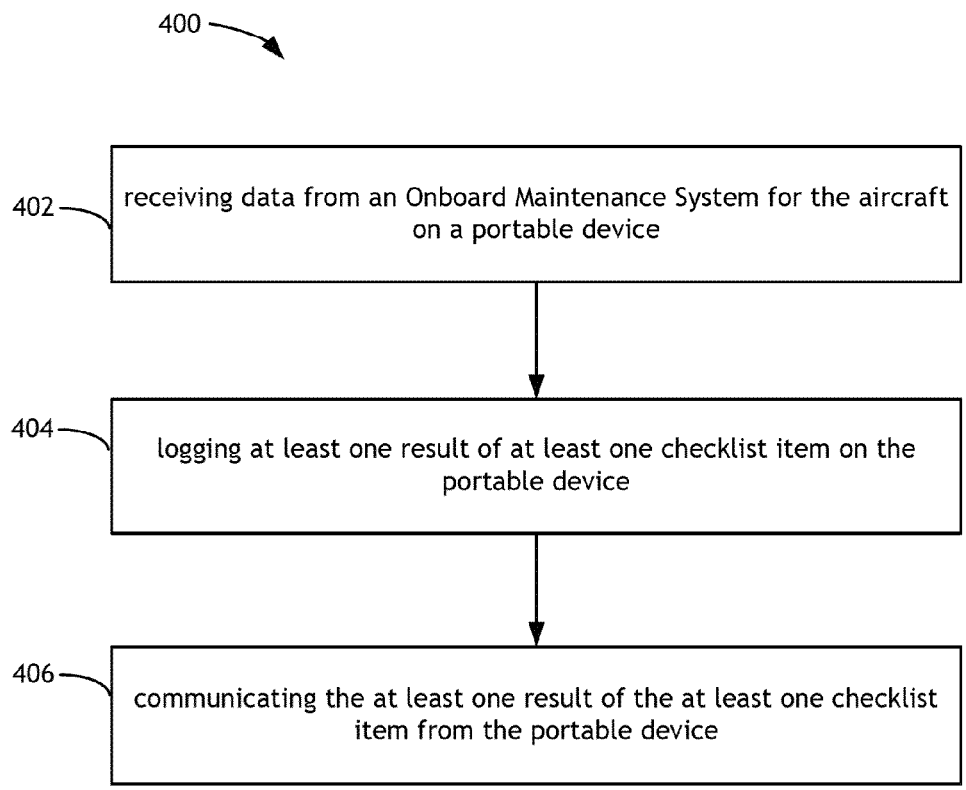
FIG. 4 is a flow diagram of a method for performing a walk around inspection of an aircraft.

The present disclosure is also directed to a method 400 for completing a walk around inspection of an aircraft, as shown in FIG. 4. The method 400 includes the step of receiving data from an Onboard Maintenance System for the aircraft on a portable device 402. The next step of the method 400 is to log at least one result of at least one checklist item on the portable device 404. A further step of the method is to communicate the at least one result of the at least one checklist item from the portable device 406. Using the method 400, it is possible to document completion of the walk around inspection of the aircraft.

The step of receiving data from an Onboard Maintenance System for the aircraft on a portable device 402 of the method 400 may include receiving data such as known deficiencies or faults for the aircraft, maintenance records, engine data, Aircraft Condition Monitoring data, or line replaceable unit data.

The step of communicating the result of the at least one checklist item from the portable device 406 of the method 400 may include communicating the result to a maintenance support provider or an onboard system for the aircraft.

The method 400 shown in FIG. 4 may also include the step of transmitting a request for information from the portable device and receiving a response containing the requested information on the portable device. For example, an operator or flight crew member performing a walk around inspection of the aircraft may request information from an operation support provider about an issue identified during the course of the inspection. The request may include a photographic or video image documenting an item on the checklist. The operation support provider may respond to this request by sending the requested information. In one example, the response may include a photographic or video image demonstrating how the checklist item should appear. Requests may also be transmitted to the aircraft's Onboard Maintenance System, flight deck, an airline, regulator, aircraft systems manufacturer, or other entity.

Figure 5:
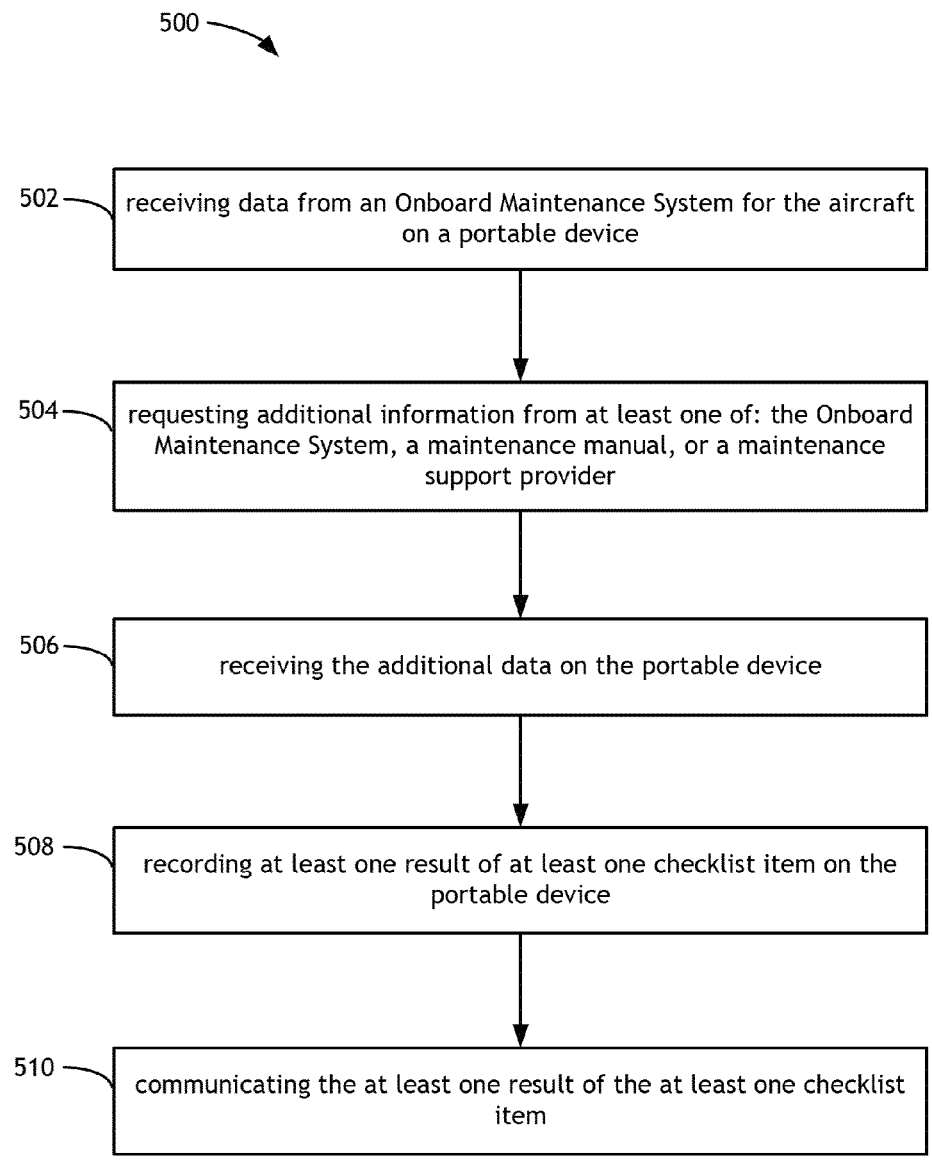
FIG. 5 is a flow diagram of a method for performing a walk around inspection of an aircraft.

The present disclosure is also directed to the method 500 for completing a walk around inspection of an aircraft shown in FIG. 5. The method 500 includes the step of receiving data from an Onboard Maintenance System for the aircraft on a portable device 502. The next step is to request additional information from at least one of: the Onboard Maintenance System, a maintenance manual, or a maintenance support provider 504. A further step of the method is to receive the additional data on the portable device 506. The method also includes recording at least one result of at least one checklist item on the portable device 508 and communicating the at least one result of the at least one checklist item 510.

The system and methods of the present disclosure may be used to document compliance with a requirement to perform a walk around inspection of an aircraft. In one embodiment, operation of the aircraft may be prevented if the walk around inspection is not performed and properly documented, or if certain items on the checklist fail.

It is understood that the present disclosure is not limited to any underlying implementing technology. The present disclosure may be implemented utilizing any combination of software and hardware technology. The present disclosure may be implemented using a variety of technologies without departing from the scope and spirit of the disclosure or without sacrificing all of its material advantages.

In the present disclosure, the methods disclosed may be implemented as sets of instructions or software readable by a device. Further, it is understood that the specific order or hierarchy of steps in the methods disclosed are examples of exemplary approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

What is claimed is:

1. A system for completing a walk around inspection of an aircraft, comprising:
   a processor;
   a memory;
   a user interface, the user interface including a user input system and a user output system, the user interface configured for presenting a graphical checklist for the inspection of the aircraft, the graphical checklist including a compliance record for the inspection of the aircraft and at least one aircraft-specific portion; and
   a communications device, the communications device configured for: communicating with an Onboard Maintenance System for the aircraft; sending the compliance record to the flight deck of the aircraft; and communicating a signal indicating a status of the inspection, wherein the status of the inspection includes a result of Not Started or Complete.

2. The system as claimed in claim 1, further comprising a camera.

3. The system as claimed in claim 1, wherein the communications device is further configured for receiving maintenance data including at least one of: known deficiencies or faults for the aircraft, maintenance records, engine data, Aircraft Condition Monitoring data, or line replaceable unit data.

4. The system as claimed in claim 1, wherein the communications device is configured for communicating with a maintenance support provider.

5. The system as claimed in claim 1, wherein the graphical checklist includes at least one of: a photographic or video image for demonstrating a desired feature.

6. A method for completing a walk around inspection of an aircraft, comprising:
   receiving aircraft-specific data from an Onboard Maintenance System for the aircraft on a portable device,
   logging at least one result of at least one checklist item on the portable device;
   generating a compliance record documenting the completion of the at least one result of at least one checklist item; and
   communicating an inspection status signal, the result of the at least one checklist item, and the compliance record from the portable device.

7. The method of claim 6, wherein the data includes known deficiencies or faults for the aircraft, maintenance records, engine data, Aircraft Condition Monitoring data, or line replaceable unit data.

8. The method of claim 6, wherein the communicating the result of the least one checklist item from the portable device includes communicating the result to at least one of: a maintenance support provider and an onboard system for the aircraft.

9. The method of claim 6, further comprising the steps of:
   transmitting a request for information from the portable device;
   receiving a response containing the requested information on the portable device.

10. The method of claim 9, wherein the response includes a photographic or video image for demonstrating a desired feature in proper working order.

11. The method of claim 9, wherein the receiving a response containing the requested information on the portable device includes receiving a response from a maintenance support provider.

12. A method for completing a walk around inspection of an aircraft, comprising:
   receiving aircraft-specific data from an Onboard Maintenance System for the aircraft on a portable device;
   requesting additional information from at least one of: the Onboard Maintenance System, a maintenance manual, or a maintenance support provider;
   receiving the additional data on the portable device;
   recording at least one result of at least one checklist item on the portable device;
   generating a compliance record documenting the completion of the at least one result of at least one checklist item; and
   communicating an inspection status signal, the result of the at least one checklist item, and the compliance record to at least the flight deck of the aircraft.

13. The method of claim 12, wherein the data includes known deficiencies or faults for the aircraft, maintenance records, engine data, Aircraft Condition Monitoring data, or line replaceable unit data.

14. The method of claim 12, wherein the communicating the result of the at least one checklist item includes communicating the result to at least one of: a maintenance support provider or an onboard system for the aircraft.

15. The method of claim 12, wherein the receiving the additional data on the portable device includes receiving a photographic or video image for demonstrating a desired feature in proper working order.

16. The method of claim 12, wherein the receiving the additional data on the portable device includes receiving a response from a maintenance support provider.

17. The method of claim 12, wherein the operation of the aircraft is prevented if result of the at least one checklist item is non-compliant.

18. The system as claimed in claim 1, wherein the communications device is further configured to provide high speed or immediate communication with the Onboard Maintenance System.

19. The system as claimed in claim 1, wherein the graphical checklist also includes one or more inspection points, wherein at least a second detailed checklist is provided at each of the one or more inspection points, and wherein the graphical checklist also includes a graphical aircraft summary for the inspection.

20. The system as claimed in claim 1, wherein the graphical checklist corresponds to a specific checklist mode, wherein the specific checklist mode includes at least one of a pre-fueling mode or a post-fueling mode.

\* \* \* \* \*